W. L. LEONARD & J. E. MYERS.
CROSS HEAD PIN.
APPLICATION FILED DEC. 7, 1917.
1,274,061.
Patented July 30, 1918.
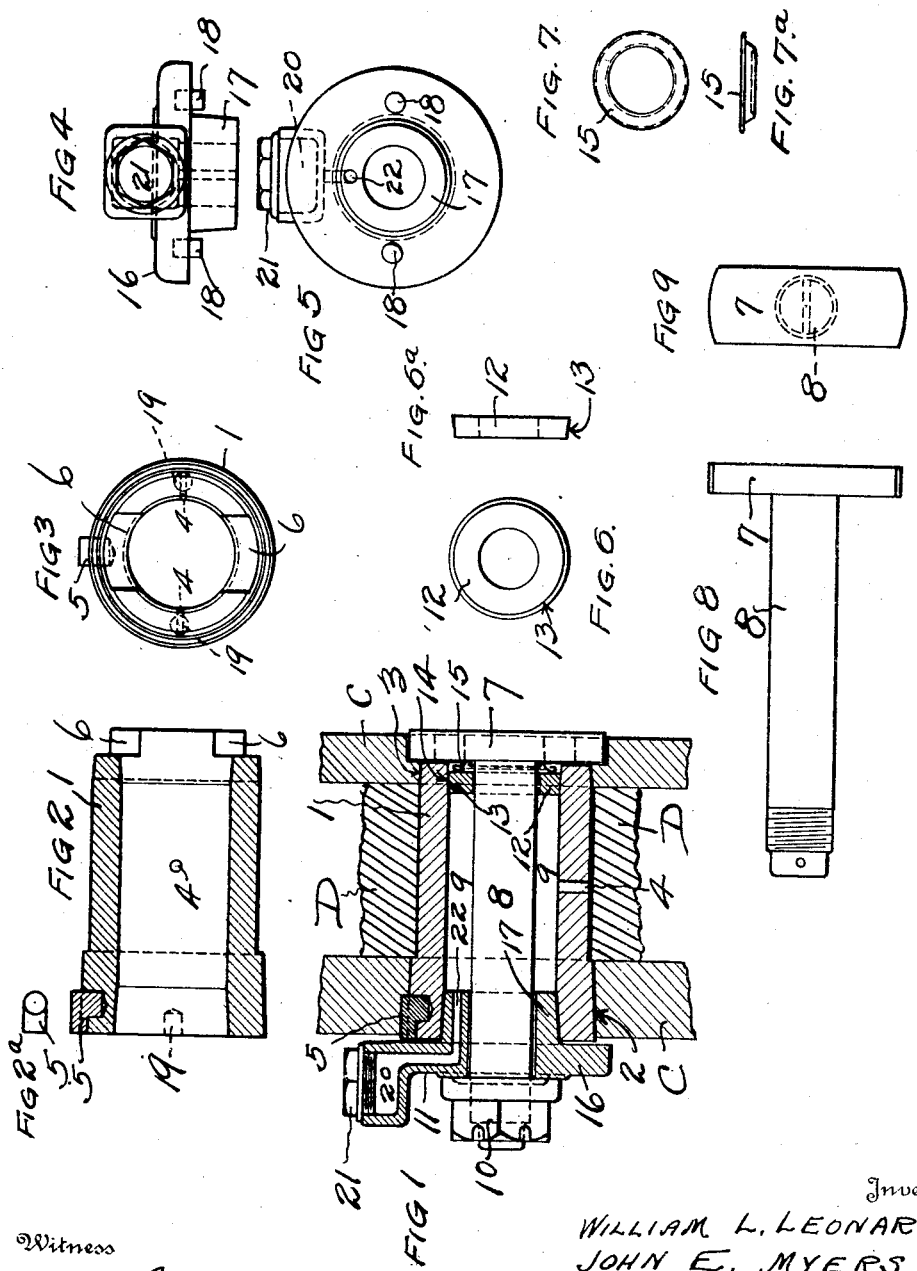
Witness
E. D. Groff
Inventors
WILLIAM L. LEONARD
JOHN E. MYERS
By N. E. Gee
Attorney

UNITED STATES PATENT OFFICE.

WILLIAM L. LEONARD AND JOHN E. MYERS, OF ALTOONA, PENNSYLVANIA.

CROSS-HEAD PIN.

1,274,061.　　　　Specification of Letters Patent.　　Patented July 30, 1918.

Application filed December 7, 1917.　Serial No. 206,041.

*To all whom it may concern:*

Be it known that we, WILLIAM L. LEONARD and JOHN E. MYERS, citizens of the United States, residing at Altoona, in the county of Blair and State of Pennsylvania, have invented certain new and useful Improvements in Cross-Head Pins, of which the following is a specification.

This invention relates to fastening devices in the nature of a pin or bolt for coupling jointed parts, and has special reference to an improvement therein whereby the parts secured together thereby may be kept properly lubricated.

That is to say the present invention has particularly in view a novel cross head pin which is used to connect the front end of the main rod of a steam locomotive to the cross head which is carried by the piston rod. In this connection one of the important features of the present device is to provide a cross head pin of a construction that may be readily removed without taking down the parts of the adjacent machinery which is the principal objection to the present design of cross head pins, and which will also furnish sufficient lubricant to the parts at all points.

Another object of the device is to provide a novel construction which provides ample means for retaining the lubricant in such a manner that it will be effectively fed to the parts necessary to be lubricated while at the same time preventing waste or the spreading of the lubricant over the adjacent parts of the locomotive.

A further object of the invention is to provide a cross head pin construction which will include all of the foregoing features in a simple and practical structural form, whereby the same may be readily assembled and taken apart and otherwise readily manipulated to facilitate adjustments and repairs.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying dawings, in which:—

Figure 1 is a longitudinal sectional view of the improved cross head pin, showing how the same fits into the proper parts of the main rod and cross head.

Fig. 2 is a longitudinal sectional view of the tubular casing element of the cross head pin.

Fig. 2ª is a plan view of the locking key which prevents relative movement between the tubular casing element of the pin and the parts of the cross head.

Fig. 3 is an end elevation of the construction shown in Fig. 2.

Fig. 4 is a top plan view of the filler plug or cap shown in section in Fig. 1.

Fig. 5 is a rear elevation of the cap or plug shown in Fig. 4.

Fig. 6 is a plan view of the stop washer which is fitted in the end of the tubular casing opposite the filler cap.

Fig. 6ª is an edge view of the washer shown in Fig. 6.

Fig. 7 is a top plan view of the resilient washer which is located between the stop washer shown in Fig. 6 and the T-head of the assembling bolt to maintain the stop washer in proper position.

Fig. 7ª is an edge view of the washer shown in Fig. 7.

Fig. 8 is an elevation of the assembling bolt with the nut thereof removed.

Fig. 9 is a top plan view of the head of the assembling bolt.

Similar reference numerals designate corresponding parts throughout the several figures of the drawings.

In carrying the present invention into effect, it is proposed to provide a tubular casing element 1 which is adapted to fit in the pivot opening in the opposite members of the cross head C and the main rod D in such a manner that relative movement of the casing with respect to these members, either circumferentially or longitudinally is prevented. That is to say, the casing is provided at 2 with a slightly beveled shoulder portion which is adapted to fit in a mating part of one of the members of the cross head, while the opposite end of the casing is also slightly tapered as at 3 to thereby have a wedging fit with the opposite member of the cross head while the intermediate portion of the exterior of the casing is uniformly cylindrical to properly receive the main rod D, and the said intermediate portion is also provided with a suitable lubricant escape hole 4. And, for the purpose of preventing rotary movement of the casing 1 a suitable key 5 may be employed.

With further reference to the characteristics of the tubular casing 1, it may also be observed that the end adjacent the beveled portion 3 is formed with opposite similarly alined slotted portions 6 for the purpose of receiving the head 7 of a T-shaped assembling bolt 8 whose shank portion is of considerably less diameter than the interior of the tubular casing thus providing an annular and relatively capacious lubricant holding chamber 9 about the said shank of the bolt. With the slotted construction of one end of the tubular casing, it will be apparent that the head 7 of the T-bolt 8 will be securely locked in position whereby the nut 10 may be readily screwed on the opposite end thereof to clamp the filler plug designated generally as 11 to the casing. In order to prevent any unnecessary projecting parts, it will be clear from Fig. 1 of the drawings that the portion of the cross head C into which the head 7 fits may be provided with a suitable recess, whereby the head of the bolt will be seated substantially flush with the outer surface of the cross head member, and as shown, the opposite ends of the bolt head will engage with the cross head to prevent longitudinal displacement of the entire pin assembly.

In order to prevent the lubricant, usually hard grease, from working out through the end of the casing where the head 7 of the bolt is fitted, it is proposed to utilize a suitable stop washer 12 whose outer edge is beveled as at 13 so as to have a wedging fit with a corresponding beveled or tapered portion 14 formed in the interior of the casing 1 as shown in Fig. 1 of the drawings. And, for the purpose of maintaining this washer tightly against its seat 14 there is preferably employed a suitable resilient washer element 15 which may be interposed between the inner side of the head 7 and the washer 13.

In connection with the filler plug 11 which is held in place by the nut 10 screwed on the end of the assembling bolt, it will be observed that the same essentially includes a flange portion 16 and a tapered stopper portion 17, which latter is adapted to engage with a correspondingly tapered face on the inner surface of the casing 1, and for the purpose of preventing relative rotation of the filler plug with reference to the casing, the inner face of the flange 16 may be formed with a pair of locking studs 18 which are adapted to fit into suitable sockets 19 formed in one end of the casing 1.

To provide for replenishing the supply of lubricant within the annular chamber 9 formed between the shank of the bolt 8 and the casing 1, the said filler plug 11 has formed therewith a suitable grease cup 20 which is rendered accessible through the screw cap 21 and communicates with the lubricant chamber 9 through a suitable channel 22.

From the foregoing it will be apparent that the present invention essentially includes a tubular casing element 1, an assembling bolt 8, preferably of T-head formation and a filler plug which is so constructed as to provide for replenishing the lubricant within the lubricant reservoir or chamber without the necessity of its removal. Also it may be observed that since the head 7 of the bolt 8 fits into the notches 6 of the casing, and also has a direct bearing engagement with a portion of the cross head, the entire pin structure will be held against longitudinal displacement and at the same time the inclined portions of the casing and cross head will be held tightly engaged.

Furthermore, if for any reason it becomes necessary to remove the bolt 8 and filler plug 11 the parts of the locomotive where the pin is used will be still held together by means of the tubular casing 1, thus avoiding much unnecessary labor incident to otherwise holding these members in place while making repairs or renewals to the parts of the cross head structure.

We claim:—

1. A device of the class described including an apertured tubular casing member, a filler plug detachably fitted in one end of said casing, and an assembling bolt for holding said filler plug in position with reference to the casing.

2. A device of the class described including a tubular casing having a radially disposed lubricant escape orifice, means for closing the opposite ends of said casing consisting of a seal and a filler plug, and an assembling bolt for holding said seal and plug in place.

3. A device of the class described including an apertured tubular casing, a filler plug adapted to fit into one end of said casing, and an assembling bolt having a shank portion of less diameter than the casing and passing longitudinally therethrough, and said bolt having a head at one end for engaging with one end of the casing and adapted to receive a nut at the other end for clamping the filler plug in position.

4. A device of the class described including an apertured tubular casing, a filler plug adapted to fit in one end of said casing, a stop washer adapted to fit the opposite end of said casing, and an assembling bolt having a shank of less diameter than the interior of the casing to provide an annular lubricant reservoir, and means on one end of the said shank for holding the filler plug and washer in place.

5. A device of the class described including a tubular casing having a lubricant escape opening, an assembling bolt having a shank disposed within the casing and its head portion detachably interlocked with one end thereof, and a filler plug fitting over the opposite end of the bolt detachably engaging and interlocking with the casing, and a nut on said bolt for holding the filler plug in position.

6. A device of the class described including an apertured tubular casing having a beveled seat formed at each end of its bore, a filler plug having a tapered stopper portion adapted to fit into the beveled seat at one end of the casing, a stop washer having a beveled outer face adapted to fit in the seat at the opposite end of the casing, an assembling bolt having a shank portion of less diameter than the bore of the casing to provide a lubricant chamber, and means at the opposite ends of said bolt for holding the filler plug and stop washer in position.

7. A device of the class described including an apertured tubular casing having slots at one end, a filler plug having a grease cup and a feed passage therein adapted to be fitted into one end of said casing, a T-head assembling bolt adapted to have its shank portion disposed longitudinally within the casing while its head portion fits in the said slots, a nut adapted to fit on the opposite end of the bolt to hold the filler plug in position, and means located at the inner side of the T-head for preventing the escape of the lubricant which surrounds the shank of the bolt.

8. A device of the class described including in combination with the parts to be connected, an apertured tubular casing adapted to fit in the pivot opening of said parts, and having stud sockets in one end and locking slots in the opposite end thereof, a key for preventing relative rotation of the casing with reference to the said parts to be connected, a filler plug including a flanged portion adapted to be secured at one end of said casing, locking studs carried by the inner face of said flange and adapted to fit into the stud sockets of the casing, a T-head assembling bolt having its head portion interlocked with the slotted end of the casing and its shank extending through the latter, and a nut adapted to be screwed on the assembling bolt opposite the head to clamp the filler plug in position.

9. A device of the class described including an apertured tubular casing, a filler plug detachably interlocked with one end of said casing and having a lubricant cup and feeding channel adapted to communicate with the interior of the casing, a T-head assembling bolt having a shank portion of less diameter than the interior of the casing and disposed longitudinally therein so as to provide an annular lubricant chamber, and said bolt being detachably interlocked with the end of the casing opposite the filler plug and also adapted to receive a nut to lock said filler plug in position, and means for preventing the escape of lubricant from the chamber at the end where the head of the bolt interlocks with the casing.

WILLIAM L. LEONARD.
JOHN E. MYERS.

Witnesses:
 ALEX. WEIR,
 JOSEPH LESTER.

Copies of this patent may be obtained for five cents each, by addressing the "Commissioner of Patents, Washington, D. C."